(12) United States Patent
Simanskaite et al.

(10) Patent No.: US 11,434,620 B2
(45) Date of Patent: Sep. 6, 2022

(54) BUCKET WITH CAST HINGE

(71) Applicant: Caterpillar Inc., Peoria, IL (US)

(72) Inventors: Giedre Simanskaite, Lisle, IL (US); Weiping Hu, Naperville, IL (US); Joseph Cai, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 305 days.

(21) Appl. No.: 16/559,989

(22) Filed: Sep. 4, 2019

(65) Prior Publication Data

US 2021/0062455 A1 Mar. 4, 2021

(51) Int. Cl.
*E02F 3/40* (2006.01)
*E02F 3/36* (2006.01)
*B23K 101/00* (2006.01)

(52) U.S. Cl.
CPC .............. *E02F 3/40* (2013.01); *E02F 3/3609* (2013.01); *E02F 3/3636* (2013.01); *B23K 2101/00* (2018.08)

(58) Field of Classification Search
CPC ......... E02F 3/40; E02F 3/3609; E02F 3/3636; B23K 2101/00
See application file for complete search history.

(56) References Cited

U.S. PATENT DOCUMENTS

| 2,926,800 | A | 3/1960 | Larsen et al. |
| 6,249,995 | B1 | 6/2001 | Bush |
| 8,069,593 | B2 * | 12/2011 | McClallen ................ E02F 3/40 37/444 |
| 9,903,093 | B2 | 2/2018 | Wan |
| 2009/0183398 | A1 | 7/2009 | McClallen et al. |
| 2018/0155898 | A1 | 6/2018 | Muthusamy et al. |

FOREIGN PATENT DOCUMENTS

| JP | 2005090052 | | 4/2005 |
| JP | 2005090052 | A * | 4/2005 |
| JP | 5336865 | | 11/2013 |
| KR | 20080107584 | A | 12/2008 |
| KR | 20140000052 | | 1/2014 |
| KR | 20140000052 | U * | 1/2014 |
| KR | 20140000052 | U | 1/2014 |

* cited by examiner

*Primary Examiner* — Daniel J. Schleis
*Assistant Examiner* — Kevin Ct Li
(74) *Attorney, Agent, or Firm* — Calfee, Halter & Griswold LLP

(57) ABSTRACT

An integrally cast hinge assembly for a bucket, including a first hinge plate, a second hinge plate spaced apart from the first hinge plate, and a torque tube portion extending between the first hinge plate and the second hinge plate, wherein the first hinge plate is weldlessly connected to the torque tube portion and the second hinge plate is weldlessly connected to the torque tube portion.

18 Claims, 12 Drawing Sheets

BUCKET WITH CAST HINGE

TECHNICAL FIELD

This disclosure relates to a machine bucket, and in particular, to a machine bucket having an integrally cast hinge assembly.

BACKGROUND

Machines, such as excavators, are used in a wide variety of applications including construction, mining, road building, and trenching. In each application, an excavator may use a bucket to penetrate into a pile of material, or a work surface such as the ground, to scoop up the material, and subsequently dump it in a desired location. The bucket is a key component in efficiently performing the desired operation.

While performing a material moving or digging operation, the bucket may be subjected to extreme loads and wear. In addition to withstanding significant loads, the bucket must also be constructed to endure a desired number of cycles or hours of operation. If a bucket fails, in addition to the cost to repair or replace the bucket, the failure may result in lost productivity. Typically, buckets are made from a plurality of welded-together pieces. The welded joints of such buckets, especially in the area of the hinge assembly on the bucket, are areas where cracks and failures due to fatigue stress can occur.

U.S. Pat. No. 9,903,093, entitled "Integrally Cast Excavator Bucket and Manufacturing Method Thereof," discloses an integrally cast excavator bucket having a lifting lug, a top plate, two side plates, and a bottom plate connected to the two side plates, wherein the lifting lug, the top plate, the two side plates, and the bottom plate are of an integral structure.

SUMMARY

In accordance with the present disclosure there is provided an integrally cast hinge assembly for a bucket.

In accordance with one aspect of the present disclosure, an integrally cast hinge assembly for a bucket includes a first hinge plate, a second hinge plate spaced apart from the first hinge plate, and a torque tube portion extending between the first hinge plate and the second hinge plate, wherein the first hinge plate is weldlessly connected to the torque tube portion and the second hinge plate is weldlessly connected to the torque tube portion.

In accordance with another aspect of the present disclosure, an excavator bucket includes a first side plate, a second side plate spaced apart from the first side plate, a support plate extending between and welded to the first side plate and the second side plate, and a wrapper having an upper edge, a first side edge, a second side edge, and a curved heel portion, the upper edge, welded to the support plate, the first side edge welded to the first side plate, and the second side edge welded to the second side plate. The excavator bucket further includes a first torque tube portion welded to the first side plate and the support plate, a second torque tube portion welded to the second side plate and the support plate, and an integrally cast hinge assembly positioned between and welded to the first torque tube and the second torque tube portion. The hinge assembly includes a first hinge plate, a second hinge plate spaced apart from the first hinge plate, and a torque tube portion extending between the first hinge plate and the second hinge plate, wherein the first hinge plate is weldlessly connected to the torque tube portion and the second hinge plate is weldlessly connected to the torque tube portion.

In accordance with another aspect of the present disclosure, a method manufacturing a machine bucket includes welding a first side plate to a first side edge of a wrapper, welding a second side plate to a second side edge of the wrapper, welding a support plate to an upper edge of the wrapper and to each of the first side plate and the second side plates, welding a first torque tube portion to the support plate and the first side plate, and welding a second torque tube portion to the support plate and the second side plate such that a gap is formed between the first and second torque tube portions. The method further includes providing a cast hinge assembly including a first hinge plate, a second hinge plate, and a third torque tube portion as an integral, weldless structure, positioning the cast hinge assembly within the gap, and welding the cast hinge assembly to the support plate, the first torque tube portion, and the second torque tube portion.

BRIEF DESCRIPTION OF THE DRAWINGS

Further features and advantages will be evident from the following illustrative embodiment which will now be described, purely by way of example and without limitation to the scope of the claims, and with reference to the accompanying drawings, in which:

DETAILED DESCRIPTION

Figure 1:
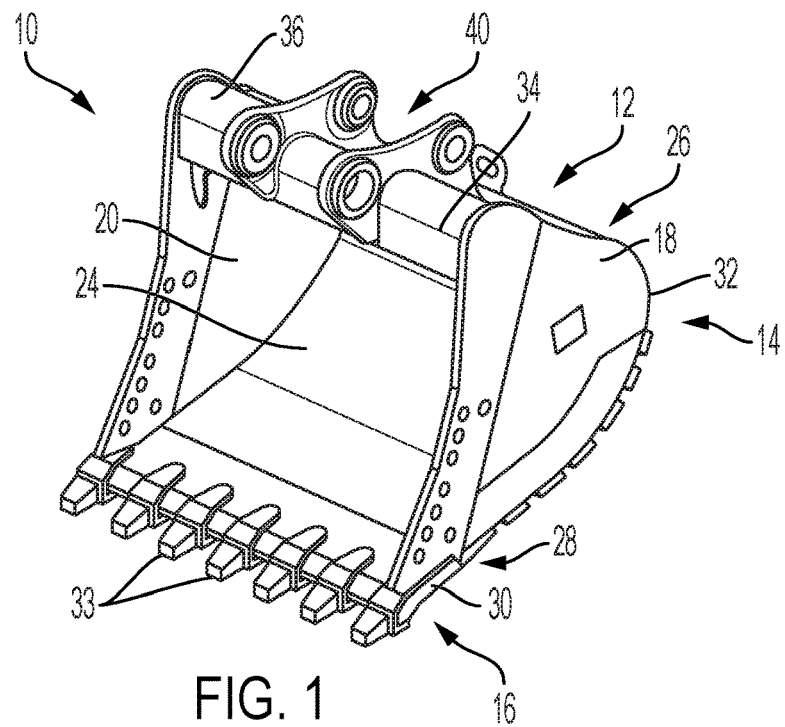
FIG. 1 is a perspective view of an exemplary embodiment of a bucket according to the present disclosure.

While the present disclosure describes certain embodiments of a bucket having a cast hinge assembly, the present disclosure is to be considered exemplary and is not intended to be limited to the disclosed embodiments. Also, certain elements or features of embodiments disclosed herein are not limited to a particular embodiment, but instead apply to all embodiments of the present disclosure.

The terminology as set forth herein is for description of the embodiments only and should not be construed as limiting the disclosure as a whole. All references to singular characteristics or limitations of the present disclosure shall include the corresponding plural characteristic or limitation, and vice versa, unless otherwise specified or clearly implied to the contrary by the context in which the reference is made. Unless otherwise specified, "a," "an," "the," and "at least one" are used interchangeably. Furthermore, as used in the description and the appended claims, the singular forms "a," "an," and "the" are inclusive of their plural forms, unless the context clearly indicates otherwise.

To the extent that the term "includes" or "including" is used in the description or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. Furthermore, when the phrase "one or more of A and B" is employed it is intended to mean "only A, only B, or both A and B."

The bucket and hinge assembly of the present disclosure can comprise, consist of, or consist essentially of the essential elements of the disclosure as described herein, as well as any additional or optional element or feature described herein or which is otherwise useful in welding applications.

The term "about" as used herein, means approximately, in the region of, roughly, or around. When the term "about" is used in conjunction with a numerical value or range, it modifies that value or range by extending the boundaries above and below the numerical values set forth. In general, the term "about" is used herein to modify a numerical value above and below the stated value by 10%.

All ranges and parameters, including but not limited to dimensions, percentages, and ratios, disclosed herein are understood to encompass any and all sub-ranges assumed and subsumed therein, and every number between the endpoints. For example, a stated range of "1 to 10" should be considered to include any and all sub-ranges beginning with a minimum value of 1 or more and ending with a maximum value of 10 or less (e.g., 1 to 6.1, or 2.3 to 9.4), and to each integer (1, 2, 3, 4, 5, 6, 7, 8, 9, and 10) contained within the range.

Figure 2:
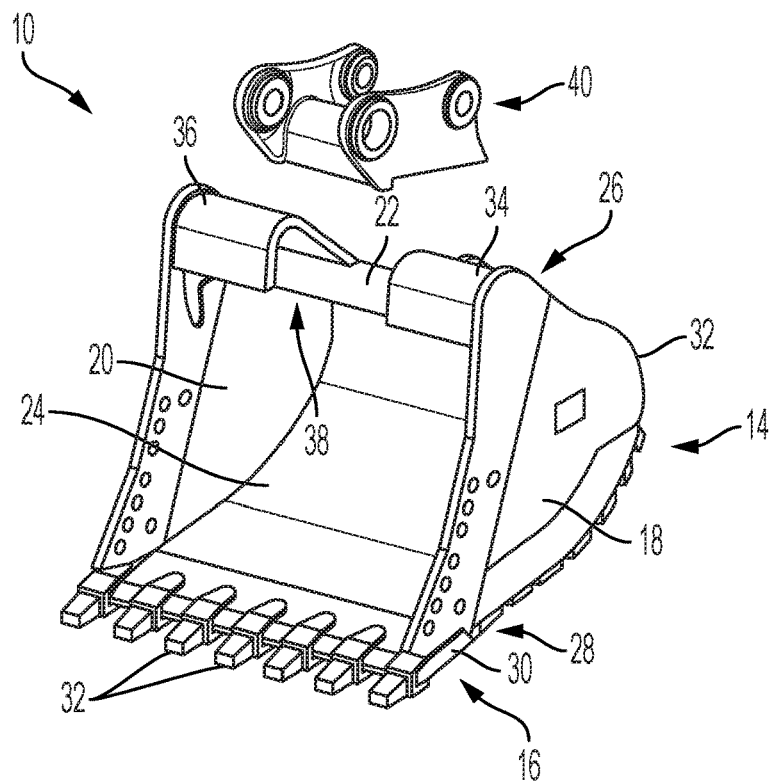
FIG. 2 is a perspective view of the bucket of FIG. 1 with the hinge assembly shown separate from the bucket.

FIGS. 1-2 illustrate an exemplary embodiment of a bucket 10 according to the present disclosure. The bucket 10 may be a component of a machine (not shown). The machine may embody a mobile machine, such as an excavator or any other suitable machine, that may perform operations associated with an industry, including, for example, mining, construction, or farming. The machine may include a linkage assembly (not shown) coupled to the bucket 10, including one or more supporting members and actuators for moving the bucket 10 to perform operations, including digging, scooping, lifting, and dumping material, such as earthen material.

The bucket 10 may include a top section 12, a middle section 14, and a bottom section 16. The bucket 10 may include a first side plate 18 extending along the one side of the top section 12, the middle section 14, and the bottom section 16 and a second side plate 20 extending along the opposite side of the top section 12, the middle section 14, and the bottom section 16. In the illustrated embodiment, the first side plate 18 is substantially a mirror image of the second side plate 20 and parallel to the second side plate 20.

It should be noted that the terms upper, lower, top, bottom, forward, rear, as well as any other similar terms are used in reference to the position of the bucket 10 and hinge assembly as depicted in the figures and the bucket 10 and hinge assembly may be positioned and used in other orientations. Further, the terms front, forward, and other similar terms refer to the open end of the bucket 10 while the terms rear, rearward, and other similar terms refer to the opposite or closed end of the bucket 10. In addition, the term laterally and other similar terms refers to the direction parallel to the width of the bucket 10 (i.e., the direction extending between the side plates 18, 20).

The top section 12 may include a support plate 22 (FIG. 2) extending laterally between the first side plate 18 and the second side plate 20. The middle section 14 may include a wrapper 24 extending between the first side plate 18 and the second side plate 20 from the top section 12 to the bottom section 16. The wrapper 24 includes a first end 26 coupled to the support plate 22, a second end 28 opposite the first end 26 and connected to a base edge 30 at the bottom section 16, and a curved heel section 32 extending between first end 26 and the second end 28.

The base edge 30 may be configured to engage and penetrate material. The bottom section 16 may also include one or more ground engaging tools 33. The ground engaging tools 33 may be coupled to base edge 30. The ground engaging tools 33 may include shrouds, teeth (adapters), top covers, half arrow segments, or any other tools, if desired.

The support plate may be welded to the first side plate 18, the second side plate 20, and the first end 26 of the wrapper 24. Likewise, the wrapper 24 and the base edge 30 may be welded to each other and to the first side plate 18 and the second side plate 20.

The top section 12 may also include a first torque tube portion 34 coupled to the support plate 22 adjacent the first side plate 18 and a second torque tube portion 36 coupled to the support plate 22 adjacent the first side plate 18 such that a gap 38 (FIG. 2) exists between the first torque tube portion 34 and the second torque tube portion 36 that is configured to receive a hinge assembly 40.

Figure 3:
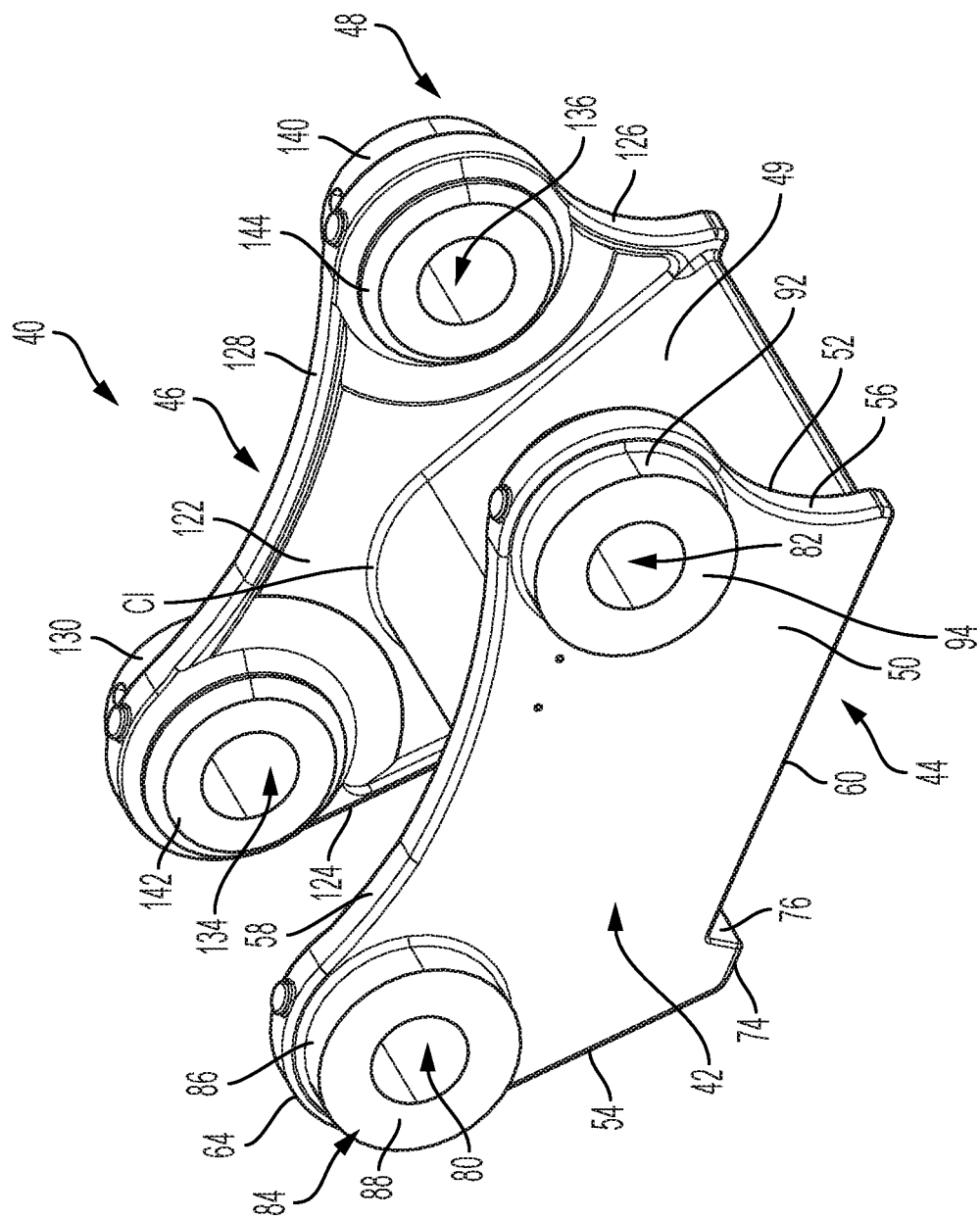
FIG. 3 is a perspective view of an exemplary embodiment of a hinge assembly of the bucket of FIG. 1.
Figure 4:
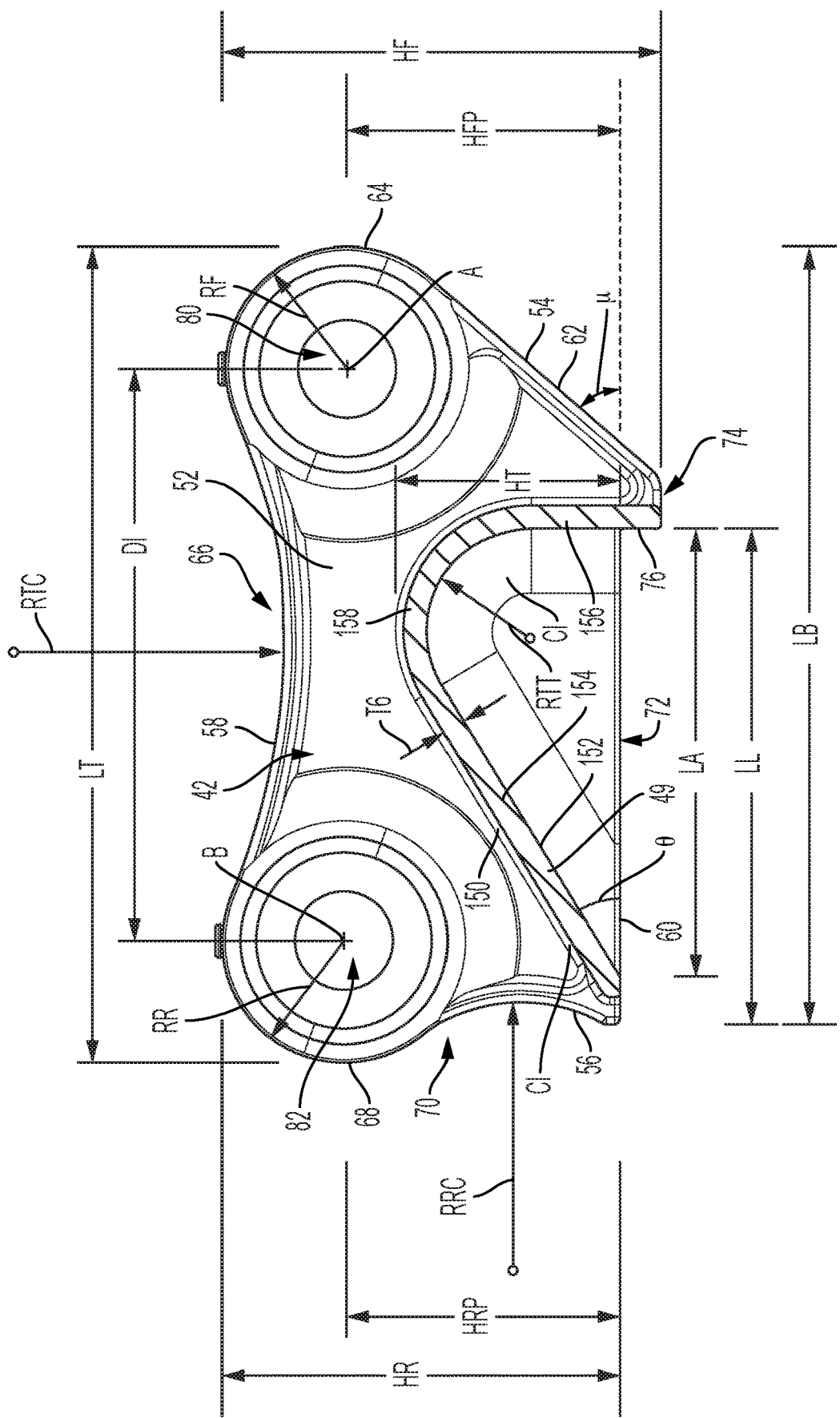
FIG. 4 is a side section view of the hinge assembly of FIG. 3.
Figure 5:
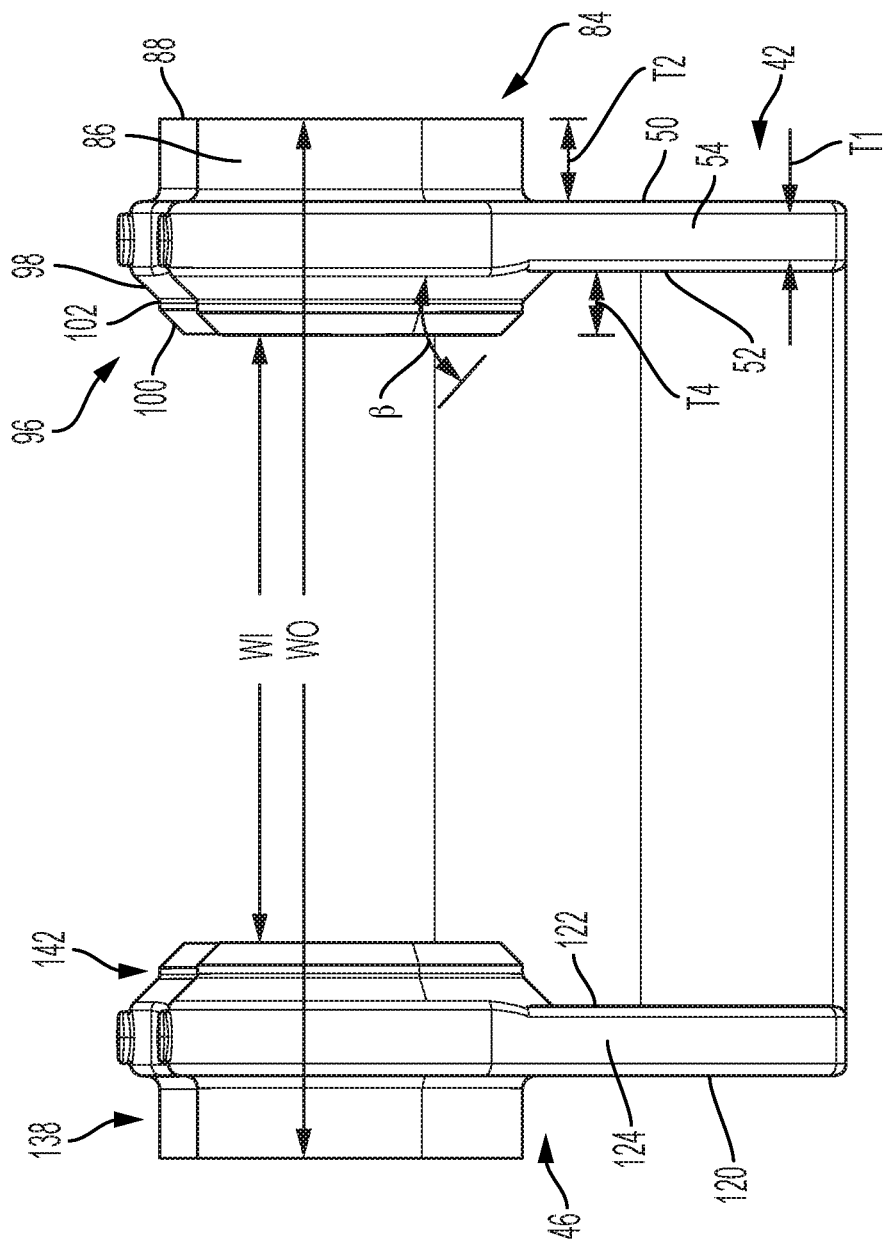
FIG. 5 is a front view of the hinge assembly of FIG. 3.

Referring to FIGS. 3-5, an exemplary embodiment of the hinge assembly 40 is illustrated. The hinge assembly 40 is manufactured through a casting process as an integral structure. Any suitable casting technique and suitable cast steel may be used. For example, in one exemplary embodiment, the hinge assembly 40 is manufactured through a sand casting process using an alloy steel.

The hinge assembly 40 may be configured in a variety of ways. Any configuration may be used that is capable of being formed as an integral structure through a casting process and capable of functioning as a hinge assembly for the bucket 10.

In the illustrated embodiment, the hinge assembly 40 includes a first hinge plate 42 defining a first side 44 of the hinge assembly 40, a second hinge plate 46 spaced apart from the first hinge plate 42 and defining a second side 48 of the hinge assembly 40, and a third torque tube portion 49 extending between the first hinge plate 42 and the second hinge plate 46.

In the illustrated embodiment, the first hinge plate 42 is parallel to and substantially the same as the second hinge plate 46, but arranged in mirror image to the second hinge plate 46. In other embodiments, however, the first hinge plate 42 and the second hinge plate 46 may be configured differently.

The first hinge plate 42 has a thickness T1 and includes a generally planar outer surface 50 and a generally planar inner surface 52 opposite the outer surface 50. In the illustrated embodiment, the thickness T1 is in the range of about 45 mm to about 55 mm, or in the range of about 47 mm to about 53 mm, or about 50 mm. In other embodiments, however, the thickness T1 may be greater than 55 mm or less than 45 mm.

The outer surface 50 and the inner surface 52 are connected by a front edge 54, a rear edge 56 opposite the front edge 54, a top edge 58 extending between the front edge 54 and the rear edge 56, and a bottom edge 60 opposite the top edge 58 and extending between the front edge 54 and the rear edge 56. The front edge 54 includes a linear section 62 that extends outward at a front angle μ relative to the bottom edge 60. In the illustrated embodiment, the front angle μ is in the range of about 35 degrees to about 45 degrees, or in the range of about 38 degrees to about 42 degrees, or about 40 degrees. In other embodiments, however, the front angle μ may be greater than 45 degrees or less than 35 degrees. Further, in other embodiments, the front edge 54 may not include a linear section. For example, the entire front edge 54 may be curved or otherwise nonlinear.

The front edge 54 transitions to the top edge 58 via a front curved portion 64. In the illustrated embodiment, the front curved portion 64 has a radius RF in the range of about 131 mm to about 151 mm, or in the range of about 136 mm to about 146 mm, or about 141 mm. In the illustrated embodiment, the top edge 58 includes an inward curved portion 66 having a center radius RTC in the range of about 1297 mm to about 1337 mm, or in the range of about 1307 mm to about 1327 mm, or about 1317 mm. In other embodiments, the radius RF may be greater than 151 mm or less than 131 mm and the center radius RTC may be greater than 1337 mm or less than 1297 mm. In some embodiments, the entire top edge 58 is curved inward. In other embodiments, however, only a portion of the top edge, such as a central portion, is curved inward. Still further, in some embodiments, the top edge 58 may be linear, outwardly curved, or any other suitable configuration The top edge 58 transitions to the rear edge 56 via a rear curved portion 68. In the illustrated embodiment, the rear curved portion 68 has a radius RR in the range of about 106 mm to about 126 mm, or in the range of about 111 mm to about 121 mm, or about 116 mm. In the illustrated embodiment, the rear edge 56 includes an inward curved portion 70 having a center radius RRC in the range of about 297 mm to about 337 mm, or in the range of about 307 mm to about 327 mm, or about 317 mm. In other embodiments, however, the radius RR may be greater than 126 mm or less than 106 mm and the center radius RRC may be greater than 337 mm or less than 297 mm. In some embodiments, the entire rear edge 56 is curved inward. In other embodiments, however, only a portion of the rear edge 56, such as a central portion, is curved inward. Still further, in other embodiments, the rear edge 56 may be linear, outward curved, or any other suitable configuration.

The bottom edge 60 is configured to mount onto, or be complimentary to, the support plate 22. In the illustrated embodiment, the bottom edge 60 includes a first linear portion 72 adjacent the rear edge 56, a second linear portion 74 adjacent the front edge 54, and a rearward facing shoulder 76 connecting the first linear portion 72 to the second linear portion 74. In the illustrated embodiment, the first linear portion 72 has a length LL in the range about 598 mm to about 618 mm, or in the range of about 603 mm to about 613 mm, or about 608 mm. In other embodiments, however, the length LL may be greater than 618 mm or less than 598 mm.

The first hinge plate 42 further includes a front pin bore 80 positioned adjacent the front curved portion 64 and extending along a front axis A, and a rear pin bore 82 positioned adjacent the rear curved portion 68 and extending along a rear axis B. In the illustrated embodiments, the front pin bore 80 is concentric with the front curved portion 64 and the rear pin bore 82 is concentric with the rear curved portion 68. In other embodiments, however, the front pin bore 80 and the rear pin bore 82 may not be concentric with the front curved portion 64 and the rear curved portion 68, respectively.

The first hinge plate 42 also includes a front outer boss 84, circumscribing the front pin bore 80 and extending from the outer surface 50 of the first hinge plate 42. In the illustrated embodiment, the front outer boss 84 has a thickness T2, a cylindrical outer side surface 86, and a planar outer face 88 that is parallel to the outer surface 50. The first hinge plate 42 further includes a rear outer boss 90, circumscribing the rear pin bore 82 and extending from the outer surface 50 of the first hinge plate 42. In the illustrated embodiment, the rear outer boss 90 has a thickness T3, a cylindrical outer side surface 92, and a planar outer face 94 that is parallel to the outer surface 50. In the illustrated embodiment, the front outer boss thickness T2 equals the rear outer boss thickness T3 and the planar outer face 94 of the rear outer boss 90 is coplanar with the planar outer face 88 of the front outer boss 84. In an exemplary embodiment, the rear outer boss thickness T3 is in the range of about 0 mm to about 40 mm, or in the range of 10 mm to about 30 mm, or about 20 mm. In other embodiments, however, the rear outer boss thickness T3 may be greater than 40 mm.

The first hinge plate 42 further includes a front inner boss 96, circumscribing the front pin bore 80, and extending from the inner surface 52 of the first hinge plate 42. In the illustrated embodiment, the front inner boss 96 has a thickness T4, a first chamfered section 98, and a second chamfered section 100 separated from the first chamfered section 98 by a radial shoulder section 102. The second chamfered section 100 tapers at an angle β relative to the inner surface 52. In the exemplary embodiment, the angle β is in the range of about 35 degrees to about 55 degrees, or about 40 degrees to about 50 degrees, or about 45 degrees. In the illustrated embodiment, the first inward chamfered section 98 extends at the same angle relative to the inner surface 52 as the second inward chamfered section 100. In other embodiments, however, the first inward chamfered section 98 may extends at a different angle relative to the inner surface 52 than second inward chamfered section 100. In an exemplary embodiment, the thickness T4 is in the range of about 10 mm to about 40 mm, or in the range of 15 mm to about 35 mm, or about 25 mm. In other embodiments, however, the rear outer boss thickness T3 may be greater than 40 mm.

The first hinge plate 42 further includes a rear inner boss 104, circumscribing the rear pin bore 82, and extending from the inner surface 52 of the first hinge plate 42. In the illustrated embodiment, the rear inner boss 104 has a thickness T5, a first inward chamfered section 106 and a second inward chamfered section 108 separated from the first inward chamfered section 106 by a radial shoulder section 110. The second inward chamfered section 100 tapers at an angle α relative to the inner surface 52. In the exemplary embodiment, the angle α is the same as the angle β. In the illustrated embodiment, the first inward chamfered section 106 extends at the same angle relative to the inner surface 52 as the second inward chamfered section 108. In other embodiments, however, the first inward chamfered section 106 may extends at a different angle relative to the inner surface 52 than second inward chamfered section 108.

As shown in FIG. 4, the first hinge plate 42 has a front height HF and a rear height HR. In the exemplary embodiment, the front height HF is in the range of about 414 mm to about 435 mm, or in the range of about 419 mm to about 430 mm, or about 424.5 mm and the rear height is in the range of about 383 mm to about 404 mm, or in the range of about 388 mm to about 399 mm, or about 393.3 mm. In other embodiments, however, the front height HF may be greater than 435 mm or less than 414 mm and the rear height HR may be greater than 404 mm or less than 383 mm.

The first hinge plate 42 has a front pin bore height HFP, as measured from the pin bore center (indicated as axis A in FIG. 4) to the first linear portion 72 of the bottom edge 60, and a rear pin bore height HRP, as measured from the rear pin bore center (indicated as axis B in FIG. 4) to the first linear portion 72 of the bottom edge 60. In the illustrated embodiment, the front pin bore height HFP is in the range of about 228 mm to about 249 mm, or in the range of about 233 mm to about 244 mm, or about 238.5 mm, and the rear pin bore height HRP is in the range of about 267 mm to about 288 mm, or in the range of about 272 mm to about 283 mm, or about 277.3 mm. In other embodiments, however, the front pin bore height HFP may be greater than 249 mm or less than 228 mm and the rear pin bore height HRP may be greater than 288 mm or less than 267 mm. The ratio of front pin bore height HFP to rear pin bore height HRP (HFP:HRP) is in the range of about 0.79 to 0.93, or about 0.86.

The center of the front pin bore 80 (indicated as axis A in FIG. 4) is a distance D1 from the center of the rear pin bore 82 (indicated as axis B in FIG. 4). In the illustrated embodiment, the distance D1 is in the range of about 568 mm to about 589 mm, or in the range of about 573 mm to about 584 mm, or about 578.7 mm. In other embodiments, however, the distance D1 may be greater than 589 mm or less than 568 mm.

The first hinge plate 42 has a bottom length LB and a top length LT. In the illustrated embodiment, the bottom length LB is in the range of about 920 mm to about 940 mm, or in the range of about 925 mm to about 935 mm, or about 930 mm, and the top length LT is in the range of about 825 mm to about 846 mm, or about 830 to about 841 mm, or about 835.7 mm. In other embodiments, however, the bottom length LB may be greater than 940 mm or less than 920 mm and the top length LT may be greater than 846 mm or less than 825 mm.

As indicated earlier, in the illustrated embodiment, the second hinge plate 46 is substantially similar to the first hinge plate 42. Thus, the description of the first hinge plate 42 applies equally to the second hinge plate 46. For example, the second hinge plate 46 includes a generally planar outer surface 120, a generally inner surface 122, a front edge 124, a rear edge 126, a top edge 128, a bottom edge 130 having a rearward facing shoulder 132, a front pin bore 134, rear pin bore 136, a front outer boss 138, a rear outer boss 140, a front inner boss 142, and a rear inner boss 144.

As shown in FIG. 5, the hinge assembly 40 has an inside width WI measured from the front inner boss 96 on the first hinge plate 42 to the front inner boss 142 on the second hinge plate 46. The hinge assembly 40 also has an outside width WO measured from the front outer boss 84 on the first hinge plate 42 to the front outer boss 138 on the second hinge plate 46. In the illustrated embodiment the inside width WI is in the range of about 425 mm to about 445 mm, or in the range of about 430 mm to about 440 mm, or about 435 mm, and the outside width WO is in the range of about 659 mm to about 679 mm, or in the range of about 664 mm to about 674 mm, or about 669 mm. In other embodiments, however, the inside width WI may be greater than 445 mm or less than 425 mm and the outside width WO may be greater than 679 mm or less than 659 mm.

As shown in FIG. 4, the third torque tube portion 49 has a top surface 150, a bottom surface 152 generally parallel to and opposite the top surface 150, and a thickness T6. The third torque tube portion 49 includes a first planar portion 154 extending upward at an angle θ relative to the bottom edge 60, a second planar portion 156 extending perpendicular, or about perpendicular, to the bottom edge 60, and a curved portion 158 connecting the first planar portion 154 to the second planar portion 156. In the illustrated embodiment, the thickness T6 is in the range about 20 mm to about 30 mm, or in the range of about 22 mm to about 28 mm, or about 25 mm, and the angle θ is in the range of about 20 degrees to about 30 degrees, or about 22 degrees to about 28 degrees, or about 24.5 degrees. The curved portion 158 has an inner radius RTT in the range of about 90 mm to about 110 mm, or about 95 mm to about 105 mm, or about 100 mm. In other embodiments, however, the thickness T6 may be greater than 30 mm or less than 20 mm, the angle θ may be greater than 30 degrees or less than 20 degrees, and the inner radius RTT may be greater than 110 mm or less than 90 mm.

The third torque tube 49 has a height HT measured from the bottom edge 60 to the uppermost portion of the top surface 150 of the curved portion 158 and a length LA measured along the bottom edge 60 between the inside surfaces 152 of the first planar portion 154 and the second planar portion 156. In the exemplary embodiment, the height HT is in the range of about 199 mm to about 220 mm, or about 205 mm to about 215 mm, or about 209.5 mm, and the length LA is in the range of about 516 mm to about 537 mm, or about 521 mm to about 532 mm, or about 526.9 mm. In other embodiments, however, the height HT may be less than 199 mm or greater than 220 mm and the length LA may be less than 516 mm or greater than 537 mm. The third torque tube 49 has a cross-section area AC measured by a multiplying the total height HT by the inside length LA. In the exemplary embodiment, the cross section area AC is in the range of about 1026 cm$^2$ to about 1181 cm$^2$, or about 1109 cm$^2$.

Figure 6:
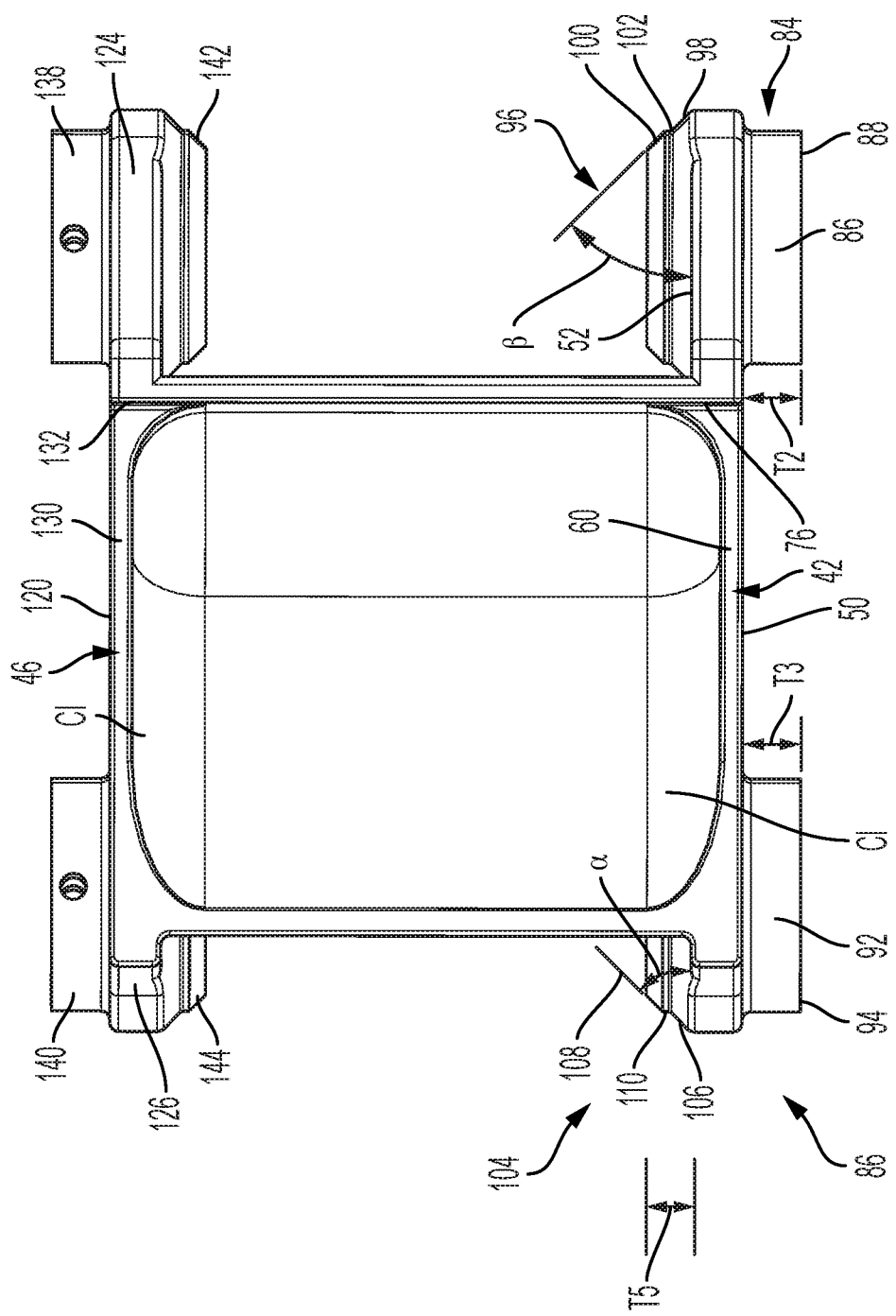
FIG. 6 is bottom view of the hinge assembly of FIG. 3.

As shown in the FIGS. 3, 4, and 6, for example, the top surface 150 and the bottom surface 152 of the third torque tube portion 49 transitions to the inner surface 52 of the first hinge plate 42 and the inner surface 122 of the second hinge plate 46, respectively, by curved or radiused intersections CI. These curved or radiused intersections CI provide for the transfer of load gradually into the surrounding structure of the hinge assembly 40 and bucket 10. In addition, as shown in FIG. 6, the corners where the third torque tube 49 intersects the first and second hinge plates 42, 46 are thicker (i.e., include additional material) as compared to the third torque tub thickness to improve the structural strength of the hinge assembly 40.

Figure 7:
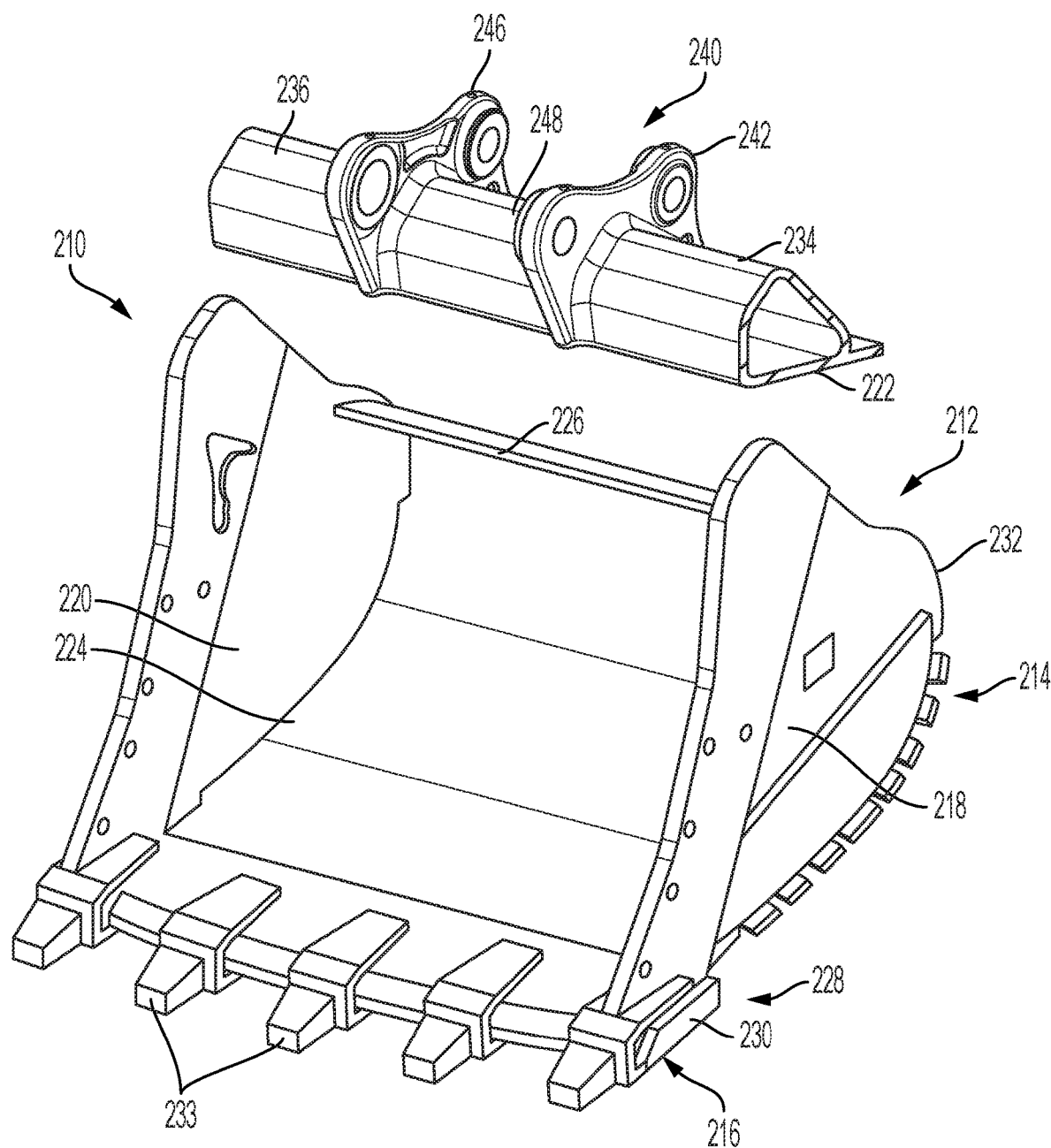
FIG. 7 is a perspective view of the bucket with another exemplary embodiment of a hinge assembly shown separate from the bucket.

FIG. 7 illustrates an exemplary embodiment of a bucket 210 according to the present disclosure. The bucket 210 is similar to the bucket 10 of FIGS. 1-2 in that the bucket 210 may include a top section 212, a middle section 214, and a bottom section 416. The bucket 210 may include a first side plate 218 extending along the one side of the top section 412, the middle section 214, and the bottom section 216, and a second side plate 220 extending along the opposite side of the top section 212, the middle section 214, and the bottom section 216. In the illustrated embodiment, the first side plate 218 is substantially a mirror image of the second side plate 220 and parallel to the second side plate 220.

The middle section 214 may include a wrapper 224 extending between the first side plate 218 and the second side plate 220 from the top section 212 to the bottom section 216. The wrapper 224 includes a first end 226, a second end 228 opposite the first end 226, and a curved heel section 232 extending between first end 226 and the second end 228. The second end 228 is connected to a base edge 230 at the bottom section 216.

The base edge 230 may be configured to engage and penetrate material. The bottom section 216 may also include one or more ground engaging tools 233. The ground engaging tools 233 may be coupled to the base edge 230. It is contemplated that, in other embodiments, the ground engaging tools 233 may include shrouds, teeth (adapters), top covers, half arrow segments, or any other tools, if desired.

The wrapper 224 and the base edge 230 may be welded to each other and to the first side plate 218 and the second side plate 220. The top section 212 may be formed by a hinge assembly 240.

Referring to FIGS. 8-13, an exemplary embodiment of the hinge assembly 240 is illustrated. As with the hinge assembly 40 of FIGS. 3-6, the hinge assembly 240 is manufactured through a casting process as an integral structure. The hinge assembly 240 may be configured in a variety of ways. Any configuration may be used that is capable of being formed as an integral structure through a casting process and capable of functioning as a hinge assembly for the bucket 10.

In the illustrated embodiment, the hinge assembly 240 may include a support plate 222, a first torque tube portion 234 adjacent the first side plate 218, a second torque tube portion 236 adjacent the second side plate 220, a first hinge plate 242 adjacent the first torque tube portion 234, a second hinge plate 246 adjacent the second torque tube portion 236, and a third torque tube portion 248 extending between the first hinge plate 242 and the second hinge plate 246. Thus, while the hinge assembly 40 of FIGS. 3-5 is configured to be attached to the support plate 22, the first torque tube portion 34, and the second torque tube portion 36, such as for example by welding, the hinge assembly 240 includes the support plate 222, the first torque tube portion 234, and the second torque tube portion 236 as part of the cast, integral structure of the hinge assembly 240. In other embodiments, however, the hinge assembly 240 may be configured similar to the hinge assembly 40 and include a first hinge plate, a second hinge plate, and a third torque tube portion that are configured to be welded to the support plate 22, the first torque tube portion 34, and the second torque tube portion 36.

In the illustrated embodiment, the first hinge plate 242 is parallel to and substantially the same as the second hinge plate 246, but arranged in mirror image to the second hinge plate 246. In other embodiments, however, the first hinge plate 242 and the second hinge plate 246 may differ. The first hinge plate 242 includes an outer surface 250, an inner surface 252 opposite the outer surface 250, and a thickness T1. In the illustrated embodiment, the thickness T1 is in the range of about 60 mm to about 80 mm, or in the range of about 65 mm to about 75 mm, or about 70 mm. In other embodiments, however, the thickness T1 may be greater than 80 mm or less than 60 mm.

The outer surface 250 and the inner surface 252 are connected by a front edge 254, a rear edge 256 opposite the front edge 254, and a top edge 258 extending between the front edge 254 and the rear edge 256. The front edge 254 includes a linear section 262 that extends outward at a front angle $\mu$ relative to the support plate 222. In the illustrated embodiment, the front angle $\mu$ is in the range of about 46 degrees to about 56 degrees, or in the range of about 48 degrees to about 54 degrees, or about 51 degrees. In other embodiments, however, the front angle $\mu$ may be less than 46 degrees or greater than 56 degrees. In some embodiments, the front edge 254 may not include a linear section. For example, the entire front edge 254 may be curved or otherwise nonlinear.

The front edge 254 transitions to the top edge 258 via a front curved portion 264. In the illustrated embodiment, the front curved portion 264 has a radius RF in the range of about 163 mm to about 183 mm, or in the range of about 168 mm to about 178 mm, or about 173 mm. In the illustrated embodiment, the top edge 258 includes an inward curved portion 266 having a center radius RTC in the range of about 980 mm to about 1020 mm, or in the range of about 990 mm to about 1010 mm, or about 1000. In other embodiments, however, the radius RF may be less than 163 mm or greater than 183 mm and the center radius RTC may be less than 980 mm or greater than 1020 mm. In some embodiments, the entire top edge 258 is curved inward. In other embodiments, however, only a portion of the top edge 258, such as a central portion, is curved inward. Still further, in other embodiments, the top edge 258 may be linear, outward curved, or any other suitable configuration.

The top edge 258 transitions to the rear edge 256 via a rear curved portion 268. In the illustrated embodiment, the rear curved portion 268 has a radius RR in the range of about 153 mm to about 173 mm, or in the range of about 158 mm to about 168 mm, or about 163 mm. In the illustrated embodiment, the rear edge 256 includes a linear portion 270 that extends at a rear angle $\sigma$ relative to the support plate 222. In the illustrated embodiment, the rear angle $\sigma$ is in the range of about 107 degrees to about 127 degrees, or in the range of about 112 degrees to about 122 degrees, or about 117 degrees. In other embodiments, however, the radius RR may be less than 153 mm or greater than 173 mm and the rear angle $\sigma$ may be less than 107 degrees or greater than 127 degrees. In other embodiments, the rear edge 256 may not include a linear section. For example, the entire rear edge 256 may be curved or otherwise nonlinear.

The rear edge 256 transitions to the support plate 260 via an inward curved portion 271 and a rearward facing shoulder 272. The inward curved portion 271 and rearward facing shoulder 272 are configured to provide a smooth stress transition through the structure of the hinge assembly 240.

The first hinge plate 242 further includes a front pin bore 280 positioned adjacent the front curved portion 264 and extending along a front axis A, and a rear pin bore 282 positioned adjacent the rear curved portion 268 and extending along a rear axis B. In the illustrated embodiments, the front pin bore 280 is concentric with the front curved portion 264 and the rear pin bore 282 is concentric with the rear curved portion 268. In other embodiments, however, the front pin bore 280 and the rear pin bore 282 may not be concentric with the front curved portion 264 and the rear curved portion 268, respectively.

The first hinge plate 242 includes a rear outer boss 290, circumscribing the rear pin bore 282, and extending from the outer surface 250 of the first hinge plate 242. In the illustrated embodiment, the first hinge plate 242 does not include a front outer boss circumscribing the front pin bore 280. In various embodiments, the presence of an inner or an outer boss, whether front or rear, may depend on the particular linkage of the machine to which the hinge assembly will attach and to the pins used to attach the hinge assembly to the linkage.

The first hinge plate 242 further includes a front inner boss 296 circumscribing the front pin bore 280 and extending from the inner surface 252 of the first hinge plate 242. The first hinge plate 242 further includes a rear inner boss 304, circumscribing the rear pin bore 282, and extending from the inner surface 252 of the first hinge plate 242.

In the illustrated embodiment, the second hinge plate 246 is substantially similar to the first hinge plate 242. Thus, the description of the first hinge plate 242 applies equally to the second hinge plate 246. For example, the second hinge plate 246 includes an outer surface 320, an inner surface 322, a front edge 324, a rear edge 326 that transition to the support plate 222 via a rearward facing shoulder 327, a top edge 328, a front pin bore 334, rear pin bore 336, a front outer boss 338, a rear outer boss 340, a front inner boss 342, and a rear inner boss 344.

Figure 9:
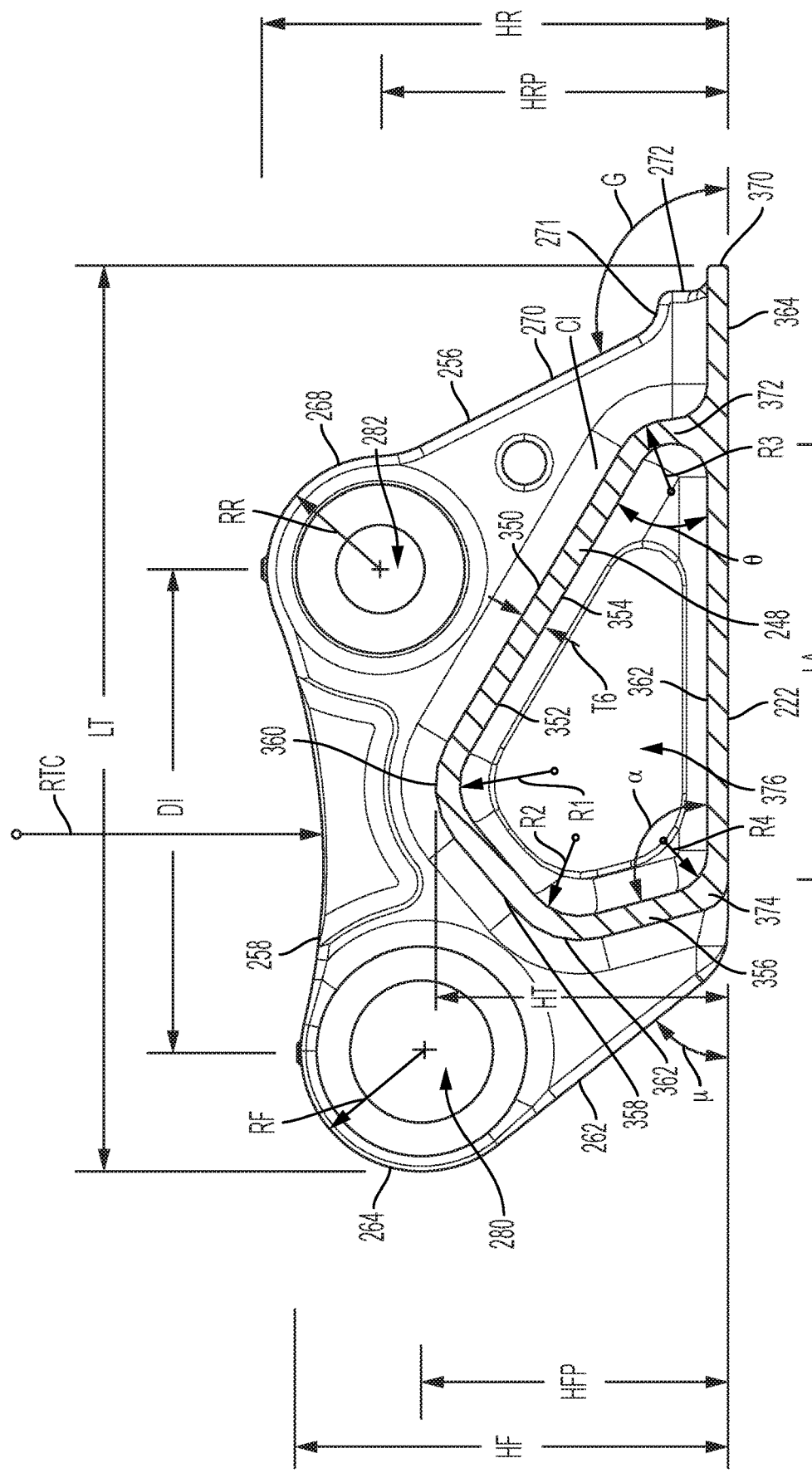
FIG. 9 is a side section view of the hinge assembly of FIG. 8.

As shown in FIG. 9, the first hinge plate 242 has a front height HF and a rear height HR. In the exemplary embodiment, the front height HF is in the range of about 599 mm to about 620 mm, or in the range of about 604 mm to about 615 mm, or about 609.4 and the rear height HR is in the range of about 650 mm to about 671 mm, or in the range of about 655 mm to about 666 mm, or about 660.4 mm. In other embodiments, however, the front height HF may be greater than 620 mm or less than 599 mm and the rear height HR may be greater than 671 mm or less than 650 mm.

The first hinge plate 242 has a front pin bore height HFP, as measured from the pin bore center (indicated as axis A in FIG. 9) to the support plate 222, and a rear pin bore height HRP, as measured from the rear pin bore center (indicated as axis B in FIG. 9) to the support plate 222. In the illustrated embodiment, the front pin bore height HFP is in the range of about 426 mm to about 447 mm, or in the range of about 431 mm to about 442 mm, or about 436.4 mm and the rear pin bore height HRP is in the range of about 487 mm to about 508 mm, or in the range of about 492 mm to about 503 mm, or about 497.5 mm. In other embodiments, however, the front pin bore height HFP may be greater than 447 mm or less than 426 mm and the rear pin bore height HRP may be greater than 508 mm or less than 487 mm.

The center of the front pin bore 280 (indicated as axis A in FIG. 9) is a distance D1 from the center of the rear pin bore 282 (indicated as axis B in FIG. 9). In the illustrated embodiment, the distance D1 is in the range of about 687 mm to about 708 mm, or in the range of about 692 mm to about 703 mm, or about 697.1 mm. In other embodiments, however, the distance D1 may be greater than 708 mm or less than 687 mm.

The first hinge plate 242 has total length LT measured from the forwardmost portion of the front curved portion 264 to the rearward most portion of the support plate 222. In the illustrated embodiment, the total length LT is in the range of about 1289 mm to about 1330 mm, or about 1299 mm to about 1320 mm, or about 1309.1 mm. In other embodiments, however, the total length LT may be greater than 1330 mm or less than about 1289 mm.

As shown in FIG. 9, the hinge assembly 240 has an inside width WI measured from the rear inner boss 304 on the first hinge plate 242 to the rear inner boss 344 on the second hinge plate 246. The hinge assembly 240 also has an outside width WO measured from the rear outer boss 290 on the first hinge plate 242 to the rear outer boss 340 on the second hinge plate 246. In the illustrated embodiment the inside width WI is in the range of about 641 mm to about 661 mm, or in the range of about 646 mm to about 656 mm, or about 651 mm, and the outside width WO is in the range of about 902 mm to about 922 mm, or in the range of about 907 mm to about 917 mm, or about 912 mm. In other embodiments, however, the inside width WI may be greater than 661 mm or less than 641 mm and the outside width WO may be greater than 922 mm or less than 902 mm.

As shown in FIG. 9, the third torque tube portion 248 has an outer surface 350, an inner surface 352 generally parallel to and opposite the outer surface 350, and a thickness T6. The third torque tube portion 248 includes a first planar portion 354 extending upward at an angle θ relative to the support plate 222, and a second planar portion 356 extending forward at an obtuse angle α relative to the support plate 222. In the illustrated embodiment, the thickness T6 is in the range about 25 mm to about 45 mm, or in the range of about 30 mm to about 40 mm, or about 35 mm, the angle θ is in the range of about 25 degrees to about 36 degrees, or about 28 degrees to about 33 degrees, or about 30.6 degrees, and the angle α is in the range of about 95 degrees to about 115 degrees, or about 100 degrees to about 110 degrees, or about 105 degrees. In other embodiments, however, the thickness T6 may be less than 25 mm or greater than 45 mm, the angle θ may be less than 25 degrees or greater than 36 degrees, and the angle α may be less than 95 degrees or greater than 115 degrees.

The third torque tube portion 248 includes a third planar portion 358 connecting the first planar portion 354 to the second planar portion 356. The first planar portion 354 transitions to the third planar portion 358 by a first curved portion 360 having a first inner radius R1 and the second planar portion 356 transitions to the third planar portion 358 by a second curved portion 362 having a second inner radius R2. In the illustrated embodiment the first inner radius R1 is equal to the second inner radius R2. In other embodiments, however, the first inner radius R1 may differ from the second inner radius R2. In the illustrated embodiment, the first inner radius R1 is in the range of about 75 mm to about 95 mm, or about 80 mm to about 90 mm, or about 85 mm. In other embodiments, however, the first inner radius R1 may be less than 75 mm or greater than 95 mm.

The third torque tube 248 has a height HT measured from a bottom surface 364 of the support plate 222 to the uppermost portion of the outer surface 350 of the first curved portion 360 and a length LA measured along the upper surface 362 of the support plate 222 between the inside surfaces 352 of the first planar portion 354 and a second planar portion 356. In the exemplary embodiment, the height HT is in the range of about 380 mm to about 401 mm, or about 385 mm to about 396 mm, or about 390.5 mm, and the length LA is in the range of about 772 mm to about 793 mm, or about 777 mm to about 788 mm, or about 782.2 mm. In other embodiments, however, the height HT may be less than 380 mm or greater than 401 mm and the length LA may be less than 772 mm or greater than 793 mm. The third torque tube 248 has a cross-section area AC measured by a multiplying the total height HT by the length LA. In the exemplary embodiment, the cross section area AC is in the range of about 2933 cm$^2$ to about 3180 cm$^2$, or about 3054.5 cm$^2$.

The support plate 222 is configured to mount to the first end 226 of the wrapper 224 and to the side plates 218, 220. In the illustrated embodiment, the support plate 222 has an upper surface 363, a lower surface 364 parallel to and opposite the upper surface 363, a first side edge 366 extending between the upper surface 363 and the lower surface 364, a second side edge 368 opposite the first side edge 366 and extending between the upper surface 363 and the lower surface 364, and a rear edge 370 extending between the first side edge 366 and the second side edge 368.

Figure 8:
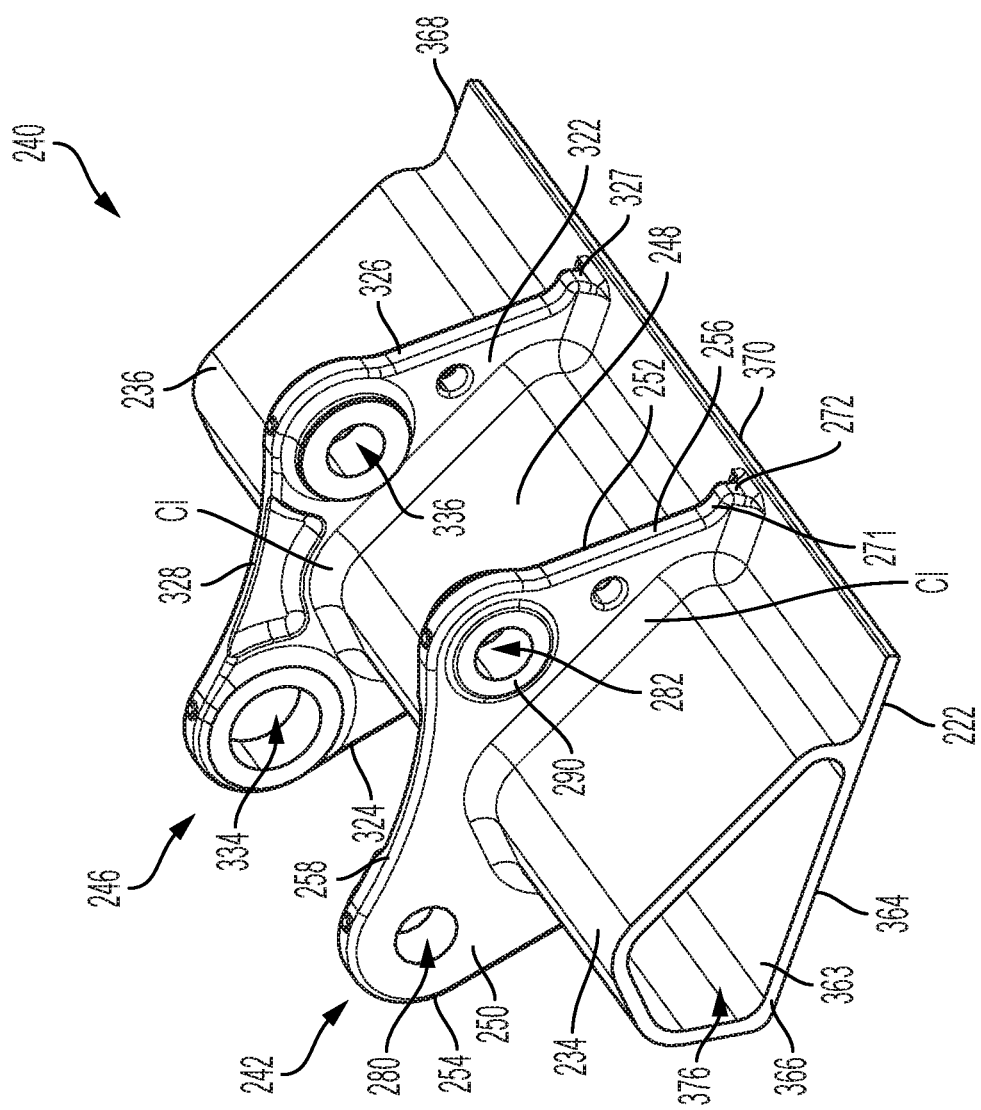
FIG. 8 is a perspective view of the hinge assembly of the bucket of FIG. 7.

As shown in FIGS. 8-9, the support plate 222 serves as the bottom portion of the first, second, and third torque tube portions 234, 236, 248. Thus, the upper surface 363 of the support plate 222 is an inner surface within the torque tube portions 234, 236, 248. The first planar portion 354 transitions into the support plate 222 via a third curved portion 372 having an outer radius R3. In the illustrated embodiment, the outer radius R3 is in the range of about 75 mm to about 95 mm, or about 80 mm to about 90 mm, or about 85 mm. The second planar portion 356 transitions into the support plate 222 via a fourth curved portion 374 having an inner radius R4 in the range of about 50 mm to about 70 mm, or about 55 mm to about 65 mm, or about 60 mm. In other embodiments, however, the outer radius R3 may be less than 75 mm or greater than 95 mm, and the inner radius R4 may be less than 50 mm or greater than 70 mm.

As shown in FIGS. 8-9, the support plate 222 along with the planar portion 354, 356, 358 and curved portions 360, 362, 372, 374 of the torque tubes portions 234, 236, 248 form a closed, diamond-like opening 376 through the torque tube portions 234, 236, 248. In the illustrated embodiment, the first torque tube portion 234 and the second torque tube portion 236 are configured substantially the same as the third torque tube portion 248.

Figure 10:
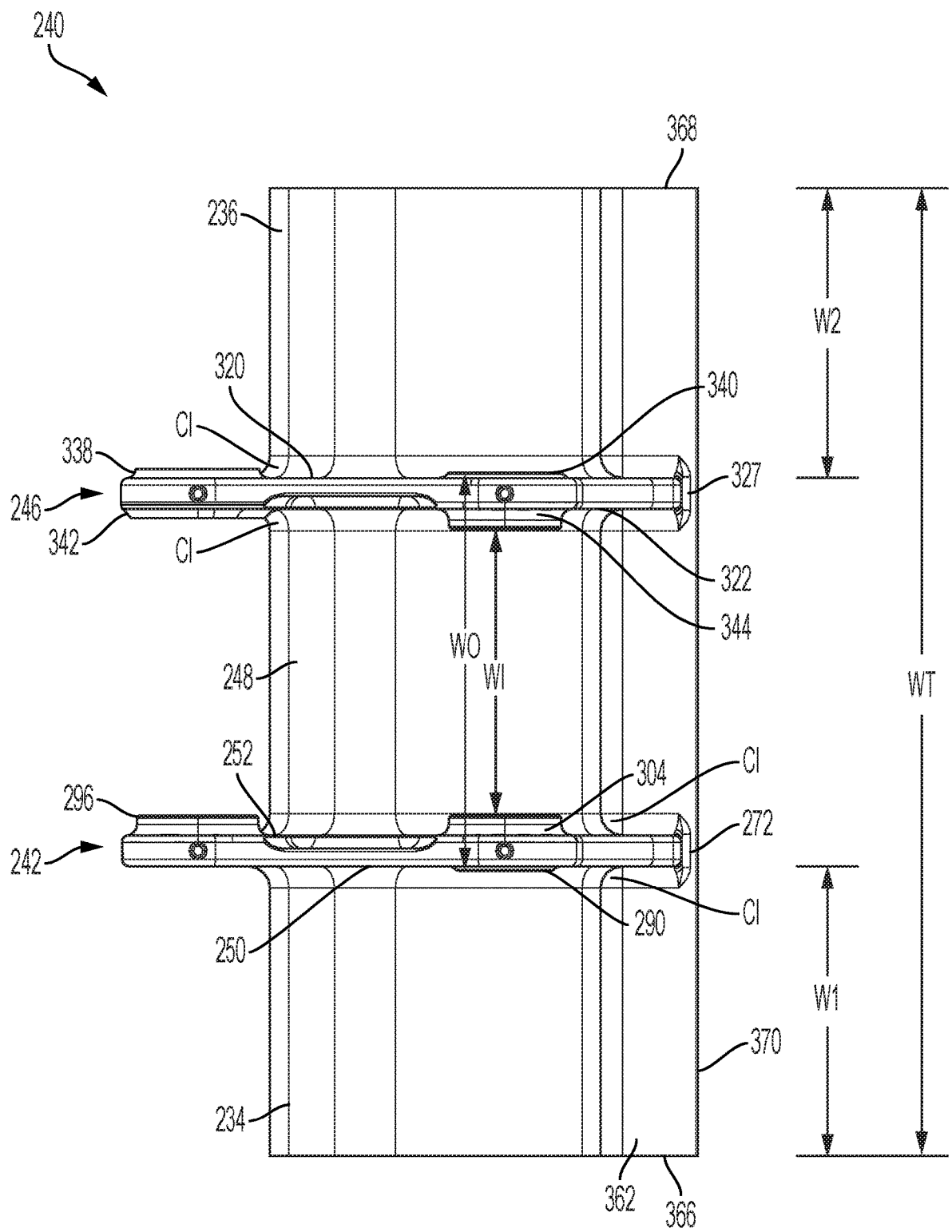
FIG. 10 is a top view of the hinge assembly of FIG. 8.

Referring to FIG. 10, the hinge assembly 240 has a total width WT, the first torque tube portion 234 has a first width W1, and the second torque tube portion 236 has a second width W2. In the illustrated embodiment, the first width W1 is equal to the second width W2. In other embodiments, however, the first width W1 may be different than the second width W2. In the illustrated embodiment, the total width WT is in the range of about 2180 mm to about 2220 mm, or in the range of about 2190 mm to about 2210 mm, or about 2200 mm and, the first width W1 is in the range of about 649 mm to about 669 mm, or in the range of about 654 mm to about 664 mm, or about 659 mm. In other embodiments, however, total width WT may be less than 2180 mm or greater than 2220 mm, and the first width W1 may be less than 649 mm or greater than 669 mm.

Figure 11:
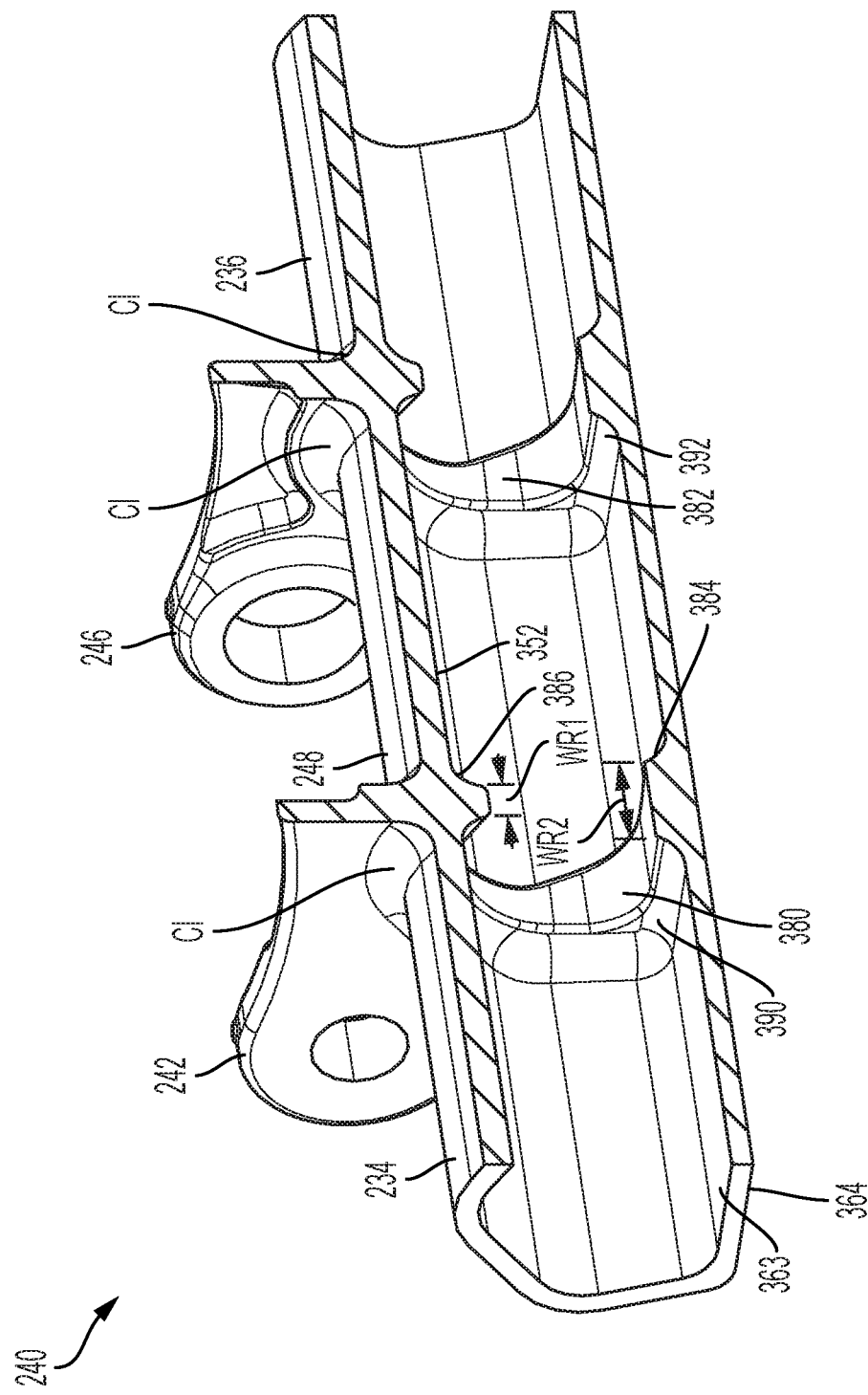
FIG. 11 is a section view of the hinge assembly of FIG. 8.

Referring to FIG. 11, the hinge assembly 240 includes a first inner rib 380 and a second inner rib 382. The first inner rib 380 is aligned with the first hinge plate 242 and extends inward from the inner surface 352 at an intersection between the first torque tube portion 234 and the third torque tube portion 248. The second inner rib 382 is aligned with the first hinge plate 242 and extends inward from the inner surface 352 at an intersection between the second torque tube portion 236 and the third torque tube portion 248. In the illustrated embodiment, the first inner rib 380 is identical to the second inner rib 382, thus, the description of the first inner rib 380 applies equally to the second inner rib 382. In other embodiments, however, the first inner rib 380 may not be identical to the second inner rib 382.

The first inner rib 380 may be configured in a variety of ways. In the illustrated embodiment, the first inner rib 380 is continuous and extends around the entire periphery of the opening 376. In other embodiments, the first inner rib 380 may not extend around the entire periphery of the opening 376. The first inner rib 380 includes a lower portion 384 having a first width WR1 and an upper portion 386 having a second width WR2 that is greater than the first width WR1. In the exemplary embodiment, the first width WR1 is in the range of about 20 mm to about 40 mm, or about 25 mm to about 35 mm, or about 30 mm, and the second width WR2 is in the range of about 135 mm to about 155 mm, or about 140 mm to about 150 mm, or about 145 mm. In other embodiments, however, the first width WR1 may be less than 20 mm or greater than 40 mm, and the second width WR2 may be less than 135 mm or greater than 155 mm.

As shown in FIG. 11, the width of the first inner rib 380 tapers inward from the lower portion 384 to the upper portion 386 along the inner surface 352. The first inner rib 380 transitions to the inner surface 352 and the upper surface 363 via a curved or radiused intersection 390 around both the interface between the first inner rib 380 and the first torque tube portion 234 and the interface between the first inner rib 380 and the third torque tube portion 248. Likewise, the second inner rib 382 transitions to the inner surface 352 and the upper surface 363 via a or radiused intersection 392 around both the interface between the second inner rib 382 and the second torque tube portion 236 and the interface between the second inner rib 382 and the third torque tube portion 248.

As shown in the FIGS. 8-11, for example, the outer surface 350 of the third torque tube portion 248 transitions to the inner surfaces 252 of the first hinge plate 242 and the inner surface 322 of the second hinge plate 246 by curved or radiused intersections CI. Likewise, the outer surface of the first torque tube portion 234 transitions to the outer surface 250 of the first hinge plate 242 by curved or radiused intersections CI and the outer surface of the second torque tube portion 236 transitions to the outer surface 320 of the second hinge plate 246 by curved or radiused intersections CI. These curved or radiused intersections CI provide for the transfer of load gradually into the surrounding structure of the hinge assembly 240 and bucket 210.

Table 1 indicates dimensions for three exemplary embodiments of hinge assemblies according to the present disclosure. Embodiment A is an example of the hinge assembly 40 of FIGS. 3-6, Embodiment B is an example of the hinge assembly 240 of FIGS. 8-11, and Embodiment C is an example of a smaller hinge assembly according to the present disclosure. All numbers expressed in Table 1 are to be understood as being modified in all instances by the term "about."

TABLE 1

| | Embod. C | Embod. A | Embod. B | Ratio B/C |
|---|---|---|---|---|
| Front radius (RF), mm | 94 | 141 | 173 | 1.8 |
| Rear radius (RR), mm | 94 | 116 | 163 | 1.7 |
| Center radius (RTC), mm | 534.8 | 1317 | 1000 | 1.9 |
| Front angle (μ), degrees | 49.1 | 40.1 | 51 | 1.0 |
| Front height (HF), mm | 335.5 | 424.5 | 579.4 | 1.7 |
| Top length (LT), mm | 633.2 | 835.7 | 1032.1 | 1.6 |
| Rear height (HR), mm | 304.8 | 393.3 | 630.4 | 2.1 |
| Pin to pin distance (D1), mm | 445.2 | 578.7 | 697.3 | 1.6 |
| Bottom length (LB), mm | 603 | 930 | 1299.1 | 2.2 |
| Length (LL), mm | 385 | 608 | 860.9 | 2.2 |
| Front pin bore height (HFP) mm | 209.5 | 238.5 | 406.4 | 1.9 |
| Rear pin bore height (HRP), mm | 209.5 | 277.3 | 467.4 | 2.2 |
| Inside width (WI), mm | 302 | 435 | 645 | 2.1 |
| Outside width (WO), mm | 513 | 669 | 915 | 1.8 |
| First inner radius (R1), mm | 80 | 100 | 90 | 1.1 |
| Torque tube thickness, mm | 18 | 25 | 30 | 1.7 |
| Torque tube angle (θ), degrees | 31.3 | 24.5 | 30.6 | 1.0 |
| Hinge plate thickness (T1), mm | 35 | 50 | 70.0 | 2.0 |
| Torque tube height (HT), mm | 166 | 209.6 | 390.5 | 2.5 |
| Torque tube length (LT), mm | 346 | 526.9 | 782.2 | 2.3 |
| Torque tube area (AT), cm$^2$ | 574.4 | 1109.0 | 3054.5 | 5.3 |

As shown in the table, hinge assemblies according to the present disclosure are contemplated as having a variety of sizes and shapes. For example, for a given dimension, the value may range from the smaller size of Embodiment C to the larger size of Embodiment B, and any value in between. The front radius RF of the hinge assembly, for example, may be in the range of about 94 mm to about 173 mm, and so forth for the other parameters listed. The column containing the ratio B/C for each dimension, illustrates the ratio between the dimension on the smaller hinge assembly as compared to the dimension on the larger hinge assembly. As shown in the table, the ratio may differ for different parameters, but it typically in the range of about 1.0 to about 2.5. In other embodiments, however, a hinge assembly according to the present disclosure may one or more dimensions which have values larger than those shown for Embodiment B or smaller than those shown for Embodiment C.

INDUSTRIAL APPLICABILITY

While the exemplary embodiments of the novel hinge assemblies 40, 240 are illustrated as used in excavator buckets, the hinge assemblies may be used in other bucket applications, such as wheel loaders, backhoes, or other earth moving equipment. The hinge assemblies 40, 240 are configured with features that provide improved life/durability and increases hinge strength as compared to conventional welded hinge plate designs. For example, the hinge assemblies may include additional material at key locations, such as around the hinge bosses and at the interfaces between the torque tube portions and hinge plates.

Further, the overall shape of the hinge assembly results in improved life of the bucket and provides for the transfer of load gradually into the surrounding structure of the hinge assembly and bucket to improve the life of the bucket welds and reduce machine downtime due to maintenance. For example, for the hinge assembly 40, the hinge plates are weldlessly connected to the central torque tube portion (i.e., not connected via welds) and the front and rear bosses (both inner and outer) on both the first and second hinge plates are weldlessly connected to the respective hinge plate. In addition, in most the instances, when two surfaces intersect on the hinge assembly, the intersection is a radiused or curved intersection. For example, the intersection between the outer surface of the first hinge plate and the cylindrical outer side surface of the front outer boss is curved, as is the intersection between the upper surface of one or more of the torque tube portions and each of the hinge plates. Further, the hinge assembly includes relatively large radiuses around the pin bores which results in lower stress and better fatigue life.

Figure 12:
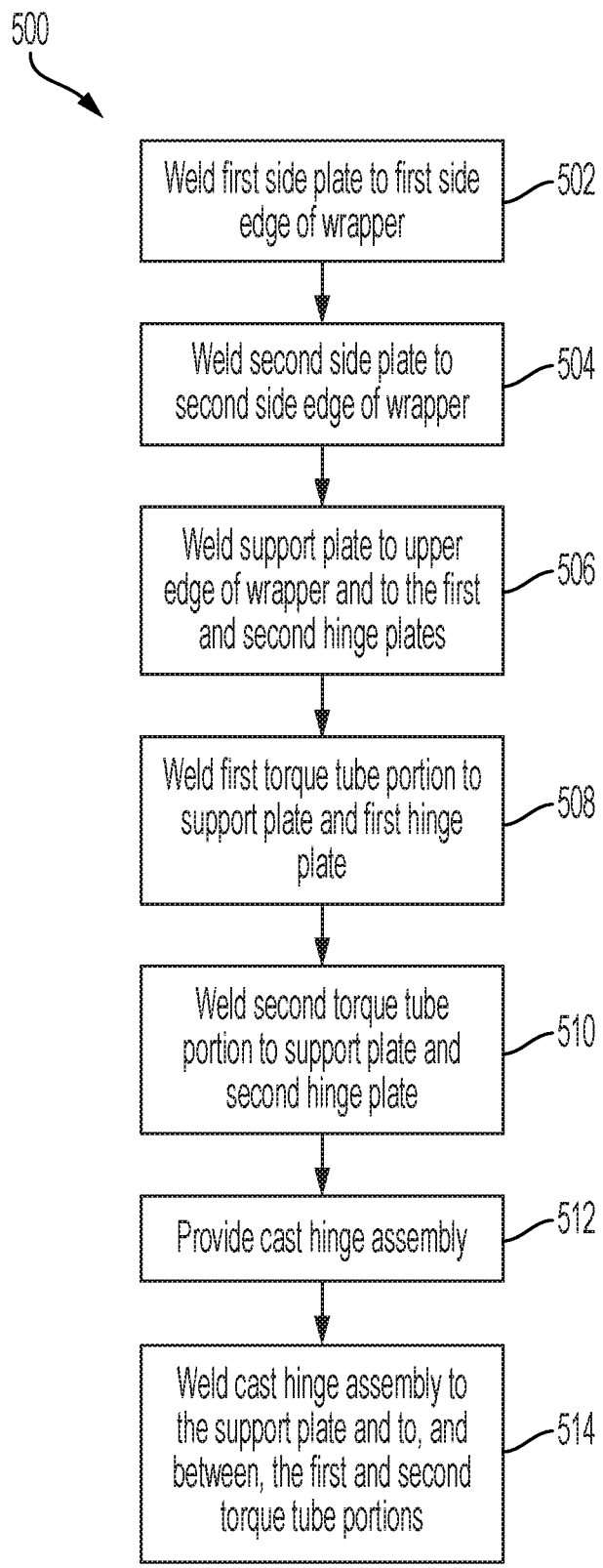
FIG. 12 is a flow chart of an exemplary embodiment of a method of manufacturing a bucket.

In addition to the improved performance of the hinge assemblies, the casting the hinge assemblies as an integral structure, as opposed to forming the hinge assemblies from a plurality of welded-together pieces, makes manufacturing the bucket simpler and less time consuming. For example, FIG. 12 illustrates an exemplary embodiment of a process 500 for manufacturing the bucket 10 of FIGS. 1-2. In step 502, a first side plate is welded to a first side edge of a wrapper. In step 504, a second side plate is welded to a second side edge of the wrapper. In step 506, a support plate is welded to an upper edge of the wrapper and to each of the first and second side plates. In step 508, a first torque tube portion is welded to the support plate and the first side plate. In step 510, a second torque tube portion is welded to the support plate and the second side plate such that a gap is formed between the first and second torque tube portions. In step 512, a cast hinge assembly is provided including a first hinge plate and second hinge plate and a third torque tube portion as an integral, weldless structure. In step 514, the cast hinge assembly is positioned with in the gap and welded to the support plate, the first torque tube portion, and the second torque tube portion.

Figure 13:
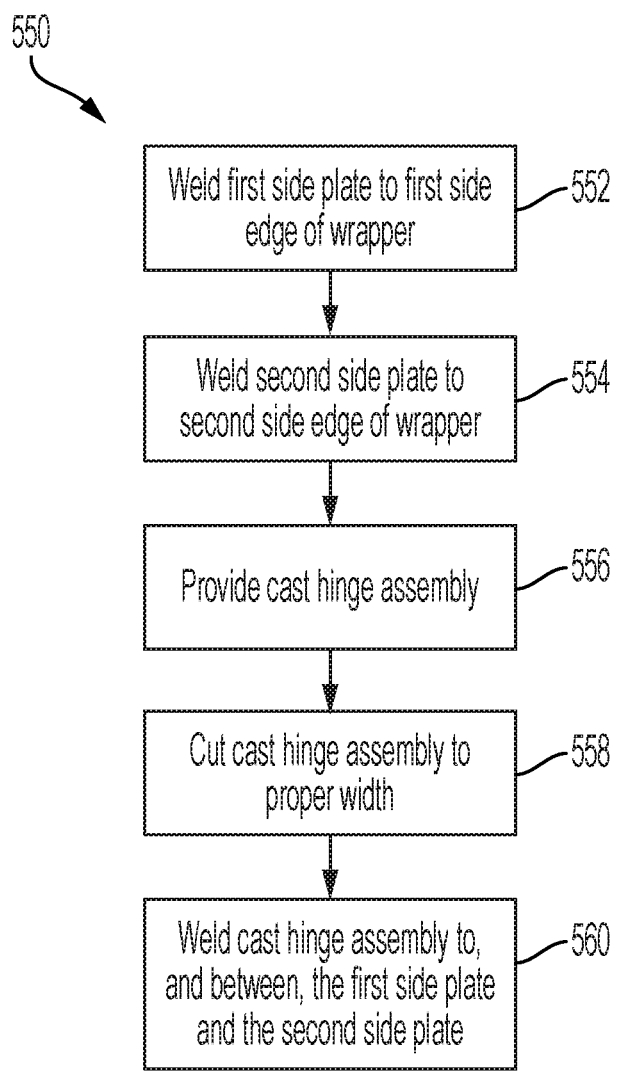
FIG. 13 is a flow chart of another exemplary embodiment of a method of manufacturing a bucket.

Referring to FIG. 13, an exemplary embodiment of a process 550 for manufacturing the bucket 410 of FIG. 9 is illustrated. In step 552, a first side plate is welded to a first side edge of a wrapper. In step 554, a second side plate is welded to a second side edge of the wrapper. In step 556, a cast hinge assembly is provided having a width and including a first hinge plate, a second hinge plate, a support plate, a first torque tube portion, a second torque tube portion, and a third torque tube portion formed as an integral, weldless structure. In step 558, if required, the first torque tube portion and/or the second torque tube portion are cut such that the width of the cast hinge assembly fits between, and spans the distance between, the first side plate and the second side plate. In step 560, the cast hinge assembly is positioned between, and welded to, the first hinge plate and the second hinge plate.

While the hinge assembly is illustrated as a hinge assembly for an excavator bucket, it may be used for other types of buckets for earth moving equipment. Unless otherwise indicated herein, all sub-embodiments and optional embodiments are respective sub-embodiments and optional embodiments to all embodiments described herein. While the present disclosure has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the present disclosure, in its broader aspects, is not limited to the specific details, the representative compositions or formulations, and illustrative examples shown and described. Accordingly, departures may be made from such details without departing from the spirit or scope of Applicant's general disclosure herein.

| LIST OF ELEMENTS | |
|---|---|
| Element Number | Element Name |
| 10 | bucket |
| 12 | top section |
| 14 | middle section |
| 16 | bottom section |
| 18 | first side plate |
| 20 | second side plate |
| 22 | support plate |
| 24 | wrapper |
| 26 | first end |
| 28 | second end |
| 30 | base edge |
| 32 | heel section |
| 33 | ground engaging tools |
| 34 | first torque tube portion |
| 36 | second torque tube portion |
| 38 | gap |
| 40 | hinge assembly |
| 42 | first hinge plate |
| 44 | first side |
| 46 | second hinge plate |
| 48 | second side |
| 49 | third torque tube portion |
| 50 | outer surface |
| 52 | inner surface |
| 54 | front edge |
| 56 | rear edge |
| 58 | top edge |
| 60 | bottom edge |
| 62 | linear section |
| 64 | front curved portion |
| 66 | inward curved portion |
| 68 | rear curved portion |
| 70 | inward curved portion |
| 72 | first linear portion |
| 74 | second linear portion |
| 76 | shoulder |
| 80 | front pin bore |

LIST OF ELEMENTS

| Element Number | Element Name |
|---|---|
| 82 | rear pin bore |
| 84 | front outer boss |
| 86 | outer side surface |
| 88 | planar outer face |
| 90 | rear outer boss |
| 92 | outer side surface |
| 94 | outer face |
| 96 | front inner boss |
| 98 | first inward tapering section |
| 100 | second inward tapering section |
| 102 | radial shoulder section |
| 104 | rear inner boss |
| 106 | first inward tapering section |
| 108 | second inward tapering section |
| 110 | radial shoulder section |
| 120 | outer surface |
| 122 | inner surface |
| 124 | front edge |
| 126 | rear edge |
| 128 | top edge |
| 130 | bottom edge |
| 132 | shoulder |
| 134 | front pin bore |
| 136 | rear pin bore |
| 138 | front outer boss |
| 140 | rear outer boss |
| 142 | front inner boss |
| 144 | rear inner boss |
| 150 | top surface |
| 152 | bottom surface |
| 154 | first planar portion |
| 156 | second planar portion |
| 158 | curved portion |
| 210 | bucket |
| 212 | top section |
| 214 | middle section |
| 216 | bottom section |
| 218 | first side plate |
| 220 | second side plate |
| 222 | support plate |
| 224 | wrapper |
| 226 | first end |
| 228 | second end |
| 230 | base edge |
| 232 | heel section |
| 233 | ground engaging tools |
| 234 | first torque tube portion |
| 236 | second torque tube portion |
| 240 | hinge assembly |
| 242 | first hinge plate |
| 246 | second hinge plate |
| 248 | third torque tube portion |
| 250 | outer surface |
| 252 | inner surface |
| 254 | front edge |
| 256 | rear edge |
| 258 | top edge |
| 260 | support plate |
| 262 | linear section |
| 264 | front curved portion |
| 266 | inward curved portion |
| 268 | rear curved portion |
| 270 | linear portion |
| 271 | inward curved portion |
| 272 | shoulder |
| 280 | front pin bore |
| 282 | rear pin bore |
| 284 | front outer boss |
| 290 | rear outer boss |
| 296 | front inner boss |
| 304 | rear inner boss |
| 320 | outer surface |
| 322 | inner surface |
| 324 | front edge |
| 326 | rear edge |
| 327 | shoulder |
| 328 | top edge |
| 334 | front pin bore |
| 336 | rear pin bore |
| 338 | front outer boss |
| 340 | rear outer boss |
| 342 | front inner boss |
| 344 | rear inner boss |
| 350 | outer surface |
| 352 | inner surface |
| 354 | first planar portion |
| 356 | second planar portion |
| 358 | third planar portion |
| 360 | first curved portion |
| 362 | second curved portion |
| 363 | upper surface |
| 364 | lower surface |
| 366 | first side edge |
| 368 | second side edge |
| 370 | rear edge |
| 372 | third curved portion |
| 374 | fourth curved portion |
| 376 | opening |
| 380 | first inner rib |
| 382 | second inner rib |
| 384 | lower portion |
| 386 | upper portion |
| 390 | curved junction |
| 392 | curved junction |
| 410 | bucket |
| 412 | top section |
| 416 | bottom section |
| 500 | process |
| 502 | step |
| 504 | step |
| 506 | step |
| 508 | step |
| 510 | step |
| 512 | step |
| 550 | process |
| 552 | step |
| 554 | step |
| 556 | step |
| 558 | step |
| 560 | step |

What is claimed is:

1. An integrally cast hinge for a bucket, comprising:
a first hinge plate having a first bottom edge and a first inner surface;
a second hinge plate spaced apart from the first hinge plate and having a second bottom edge and a second inner surface; and
a torque tube extending between the first hinge plate and the second hinge plate, the torque tube having a bottom surface;
wherein the first inner surface, the second inner surface, and the bottom surface define a recessed space;
wherein the first bottom edge, the second bottom edge, and the torque tube define an opening to the recessed space; and
wherein the first hinge plate is weldlessly connected to the torque tube and the second hinge plate is weldlessly connected to the torque tube.

2. The integrally cast hinge of claim 1, wherein the first hinge plate has a forward pin bore positioned a first distance from the first bottom edge, and a rear pin bore positioned a second distance from the first bottom edge, wherein the ratio of the first distance to the second distance is in the range of 0.79 to 0.93.

3. The integrally cast hinge of claim 2, wherein the first distance is in the range of 228 mm to 249 mm.

4. The integrally cast hinge of claim 2, wherein the forward pin bore is a third distance from the rear pin bore and wherein the ratio of first distance to third distance is in the range of 0.39 to 0.44.

5. The integrally cast hinge of claim 4, wherein the third distance is in the range of 568 mm to 579 mm.

6. The integrally cast hinge of claim 2, wherein the first hinge plate further comprises a front outer boss circumscribing the forward pin bore and extending from an outer surface of the first hinge plate, wherein the front outer boss is weldlessly connected to the first hinge plate and includes an outer side surface that transitions to the outer surface of the first hinge plate via a curved intersection.

7. The integrally cast hinge of claim 6, wherein the first hinge plate further comprises a front inner boss circumscribing the forward pin bore and extending from the first inner surface of the first hinge plate, wherein the front inner boss is weldlessly connected to the first hinge plate and includes a chamfered outer side surface.

8. The integrally cast hinge of claim 7 wherein the chamfered outer side surface extends at an angle relative to the first inner surface of the first hinge plate in a range of 20 degrees to 40 degrees.

9. The integrally cast hinge of claim 1, wherein the torque tube includes a curved portion connecting two planar portions, and wherein the curved portion has an inner radius is in the range of 90 mm to 110 mm.

10. The integrally cast hinge of claim 1, wherein the bottom surface transitions to the first inner surface and the second inner surface via curved intersections.

11. An excavator bucket, comprising:
a first side plate;
a second side plate spaced apart from the first side plate;
a support plate extending between and welded to the first side plate and the second side plate;
a wrapper having an upper edge, a first side edge, a second side edge, and a curved heel portion, the upper edge, welded to the support plate, the first side edge welded to the first side plate, and the second side edge welded to the second side plate;
a first torque tube welded to the first side plate and the support plate;
a second torque tube welded to the second side plate and the support plate;
an integrally cast hinge positioned between and welded to the first torque tube and the second torque tube, the hinge assembly comprising:
a first hinge plate having a first bottom edge and a first inner surface;
a second hinge plate spaced apart from the first hinge plate and having a second bottom edge and a second inner surface; and
a third torque tube extending between the first hinge plate and the second hinge plate, the torque tube having a bottom surface;
wherein the first inner surface, the second inner surface, and the bottom surface define a recessed space;
wherein the first bottom edge, the second bottom edge, and the third torque tube define an opening to the recessed space; and
wherein the first hinge plate is weldlessly connected to the third torque tube and the second hinge plate is weldlessly connected to the third torque tube.

12. The excavator bucket of claim 11, wherein the first hinge plate has a forward pin bore positioned a first distance from the first bottom edge, and a rear pin bore positioned a second distance from the first bottom edge and a third distance from the front pin bore, wherein the ratio of the first distance to the second distance is in the range of 0.79 to 0.93 and the ratio of first distance to third distance is in the range of 0.39 to 0.44.

13. The excavator bucket of claim 12, wherein the first distance is in the range of 228 mm to 249 mm.

14. The excavator bucket of claim 12, wherein the third distance is in the range of 568 mm to 579 mm.

15. The excavator bucket of claim 12, wherein the first hinge plate further comprises a front outer boss circumscribing the forward pin bore and extending from an outer surface of the first hinge plate, wherein the front outer boss is weldlessly connected to the first hinge plate and includes an outer side surface that transitions to the outer surface of the first hinge plate via a curved intersection.

16. The excavator bucket of claim 12, wherein the first hinge plate further comprises a front inner boss circumscribing the forward pin bore and extending from the first inner surface of the first hinge plate, wherein the front inner boss is weldlessly connected to the first hinge plate and includes a chamfered outer side surface.

17. The excavator bucket of claim 16 wherein the chamfered outer side surface extends at an angle relative to the first inner surface of the first hinge plate in a range of 20 degrees to 40 degrees.

18. The excavator bucket of claim 11, wherein the third torque tube includes a curved portion connecting two planar portions, and wherein the curved portion has an inner radius is in the range of 90 mm to 110 mm.

\* \* \* \* \*